United States Patent [19]

Foy

[11] Patent Number: 4,724,587
[45] Date of Patent: Feb. 16, 1988

[54] HARNESS PLATE

[76] Inventor: Peter S. Foy, 2156 Mohigan Way, Las Vagas, Nev. 89209

[21] Appl. No.: 924,045

[22] Filed: Oct. 28, 1986

[30] Foreign Application Priority Data

Oct. 28, 1985 [GB] United Kingdom ............ 8526512

[51] Int. Cl.⁴ ............................................. A44B 13/02
[52] U.S. Cl. ........................................ 24/656; 24/239; 24/662; 294/82.34
[58] Field of Search .............. 24/656, 238, 239, 374, 24/602, 603, 653, 662, 664; 403/164; 294/82.17, 82.23, 82.34

[56] References Cited

U.S. PATENT DOCUMENTS

| 636,096 | 10/1899 | Adkins | 24/238 |
| 1,399,207 | 12/1921 | Goozey | 24/239 |
| 1,702,418 | 2/1929 | Seebeck | 24/239 |
| 2,216,499 | 10/1940 | Ohotto | 24/239 |
| 2,667,376 | 1/1954 | Schlachter | 294/82.34 |
| 3,133,521 | 5/1964 | Cappel | 294/82.34 |
| 3,555,628 | 1/1971 | Brown | 24/603 |
| 3,880,536 | 4/1975 | Petrus | 24/662 |
| 3,883,170 | 5/1975 | Fricker et al. | 24/239 |
| 3,911,671 | 10/1975 | Guillen | 294/82.34 |
| 4,430,778 | 2/1984 | Sander | 24/239 |

FOREIGN PATENT DOCUMENTS

| 1761088 | 4/1971 | Fed. Rep. of Germany . |
| 2608211 | 1/1977 | Fed. Rep. of Germany . |
| 2832749 | 7/1980 | Fed. Rep. of Germany . |
| 786153 | 12/1973 | France . |
| 2304103 | 8/1976 | France . |
| 1541717 | 7/1979 | United Kingdom . |
| 2095646 | 10/1982 | United Kingdom . |

Primary Examiner—Victor N. Sakran
Attorney, Agent, or Firm—Bell, Seltzer, Park & Gibson

[57] ABSTRACT

A harness plate comprising a plate portion for secure attachment to a harness back plate for supporting a wearer from a support line is formed on one side with a toroidal passage centered midway between sides of the plate portion and open at one end facing an upper edge of the plate. A shackle staple is secured to the plate portion and has a pair of upwardly extending arms with opposed apertures through which passes the free end of a toroidal shackle pin telescopically mounted in the passage and biased through the arm apertures by a compression spring compressible to allow manual movement of the free end of the pin from between the arms.

The eye of a suspension rope may be positioned between the arms and secured by the pin to the plate so that support rope tension can be conveyed to the back panel in secure manner. On release of tension the connection is readily released by manual compression of the spring through a finger lever on an exposed portion of the pin.

The toroidal passage is of open channel form, closed by a removable cover plate.

7 Claims, 6 Drawing Figures

HARNESS PLATE

BACKGROUND OF THE INVENTION

1. Field of the Invention

This invention relates to a harness plate for releasably supporting a harnessed person or article from a suspension rope or wire and is particularly, but not exclusively, concerned with a harness plate for use in theatrical or stage work where a person needs to be suspended, for example, in theatrical 'flying'.

2. Description of Prior Art

It is known to suspend actors from overhead ropes or wires by means of a shoulder or body harness shackled to the end of a support rope or wire but problems arise in relation to safety and to facility of securing or releasing the rope or wire to and from the harness.

OBJECTS AND SUMMARY OF THE INVENTION

It is an object to provide an improved means of attaching a support rope or wire to a harness.

A harness plate according to the invention comprises a plate for secure attachment to a harness and formed on one side with a generally toroidal passage extending through a major part of a circular path centered substantially midway between opposite side portions of the plate, the passage being open at one end toward an upper edge of the plate at a location offset from an upright axis extending from the centre of the circular path, shackle staple of generally U-form secured to the plate with shackle arms extending upwardly from the plate upper edge on opposite sides of said upright axis towards free arm ends, opposed apertures being formed in the arms adjacent the ends, a toroidal shackle pin extending through a major part of the circle slidably mounted in the passage in arcuate telescopic manner and extendable through the apertures in the arms of the shackle staple, a compression spring mounted at the other end of the passage and arranged to bias the shackle pin to extend through the apertures and being compressible to permit reverse movement of the shackle pin from the arm aperture, whereby an eye of a support may be positioned between the arms and secured by the shackle pin passing therethrough.

Suitably means are provided to limit movement of the shackle pin under bias of the spring and also means to facilitate manual reverse movement of the shackle pin. In one embodiment such means comprise an outer projection on the pin between the open end of the passage and one of the arms of the shackle staple, arranged to engage the one arm under spring bias to limit movement of the pin through the apertures and providing the means for manual reverse movement against the spring bias.

The pin is suitably formed adjacent its free end with a radially inner recess arranged to locate between the arm of the shackle staple in operative condition, to register with the support eye such that tension in the support rope or wire will securely engage the eye in the recess to resist any tendency for lateral movement of the pin relative to the arms.

In an embodiment the generally toroidal passage is defined by a channel of generally arcuate section formed on the plate and a cover plate closing the open channel and secured to the plate, for example by screws.

BRIEF DESCRIPTION OF THE DRAWINGS

The invention will now be described, by way of example, with reference to the accompanying, partly diagrammatic drawings, in which.

DETAILED DESCRIPTION OF THE PREFERRED EMBODIMENT

Figure 1:
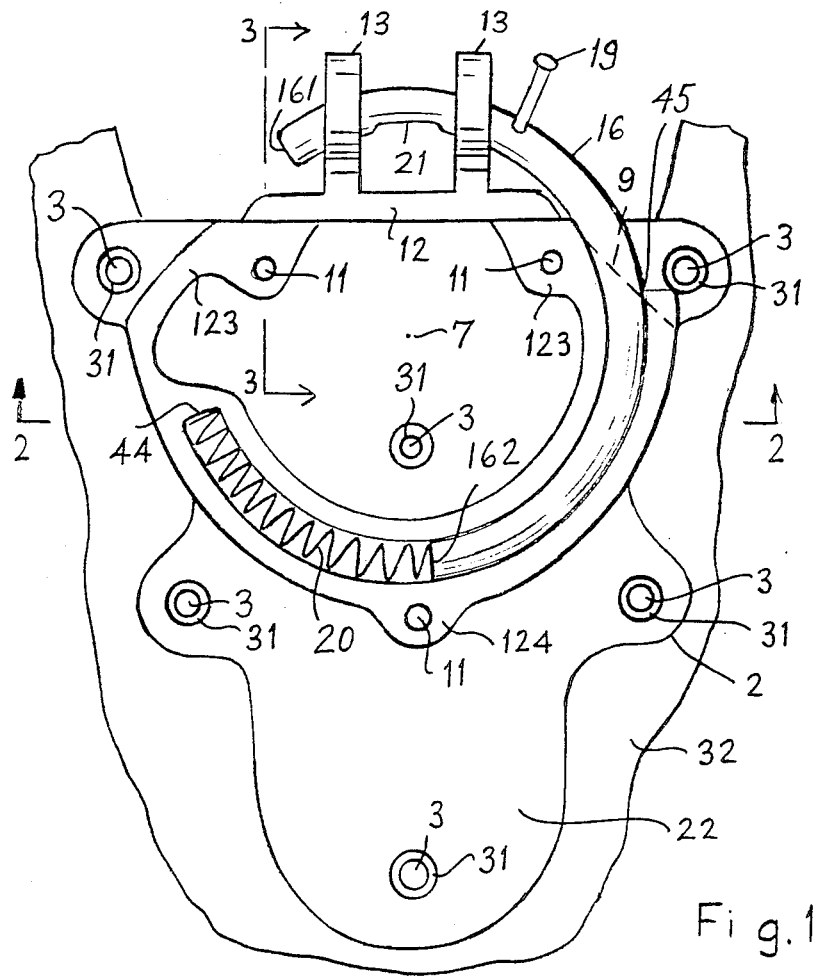
FIG. 1 is a front elevation of a harness plate according to an embodiment of the invention, with a cover plate removed, but partly shown in dotted lines.
Figure 2:
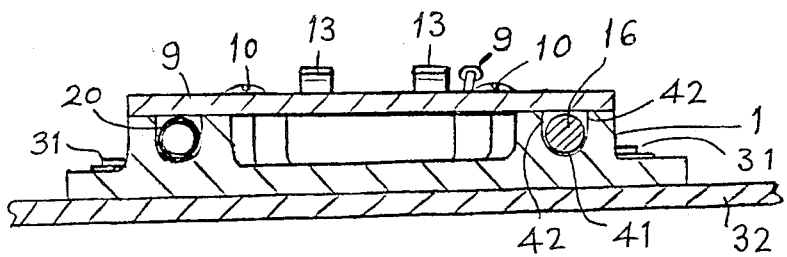
FIG. 2 is a section taken on line 2—2 of FIG. 1, viewed in the direction of the arrows, with the cover plate in position.
Figure 4:
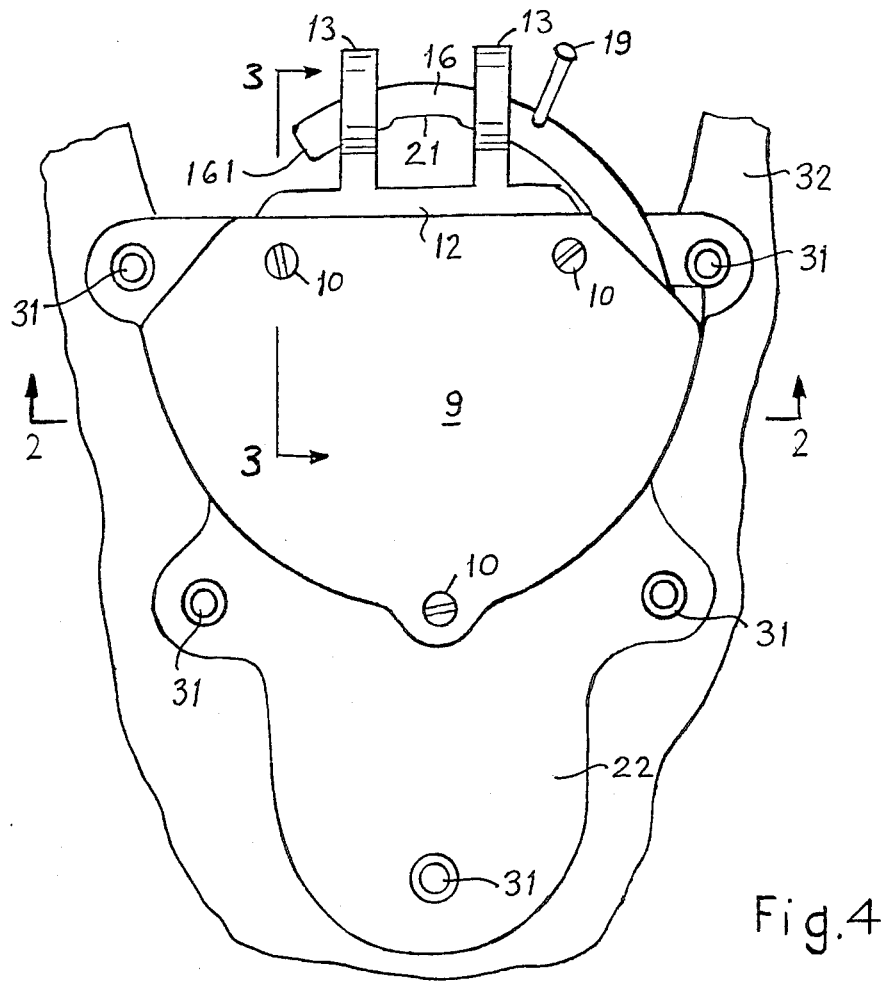
FIG. 4 is a front elevation of the harness plate of FIG. 1 with the cover plate in position.

Referring to FIGS. 1–4, the harness plate 1 comprises a mounting plate 2 having a peripheral array of five holes 3 and a generally central hole 3 for receiving rivets 31, FIG. 2, for securing the mounting plate 2 at a rear face to a harness back panel 32 of a harness described below in connection with FIGS. 4 and 5. The plate 2 on its forward face is formed with a raised generally toroidal portion 4 extending through a major part of a circumferential path within the peripheral array of apertures 3 and about the generally central aperture 3. The toroidal portion 4 is of open channel shaped section having an arcuate floor 41 and upstanding sides 42 and defining a generally toroidal passage 43 closed at one end 44 below an upper edge 21 of the plate 2 and open at the other end 45 adjacent the upper edge 21. The plate 2 has a lower plate portion 22 extending substantially below the toroidal portion 4 and formed adjacent a lower end with an aperture 3, and serving to distribute support loads, in use, over a significant height of the harness panel 32.

The part circular path has a centre 7 generally central of the width of the plate 2 and closely below the upper edge 21 and above the central aperture 3 which is within the compass of the toroidal portion 4. The channel section toroidal passage 43 is closed by a cover plate 9 as seen in FIG. 2 which overlaps the toroidal portion 4 and the open channel section passage 43 and is secured by screws 10 extending through peripheral apertures in the cover plate 9 engaging threaded apertures 11 in the plate 2. To this end three apertures 11 are formed in the plate 2, two symmetrically spaced apart on opposite sides of a vertical centre line and adjacent the upper edge 21, and a central lower aperture 11 below the toroidal portion 4, and the cover plate 9 is formed with three apertures in complementary positions.

Figure 3:
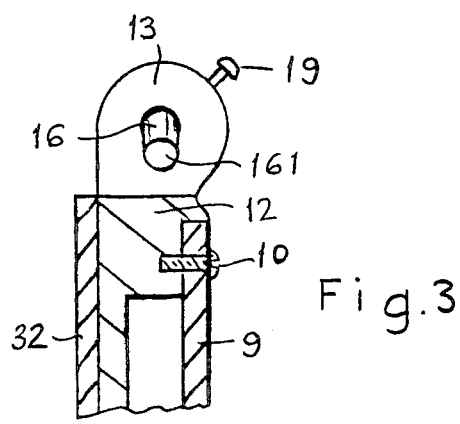
FIG. 3 is a fragmentary section taken on line 3—3 of FIG. 1.

A shackle staple 12 having a pair of upwardly extending spaced parallel arms 13 is formed on a central upper portion of the plate 2 with the arms 13 spaced apart symmetrically on opposite sides of the vertical centre line of the plate 2. To this end the plate 2 at the upper edge 21 is formed with a forwardly extending central flange portion 121 formed at a forward edge with a lower recess 122 receiving an upper edge of the cover plate 9 so that the foremost portion of the flange portion 121 is flush with the forward face of the cover plate 9 as seen in FIG. 3. The shackle arms 13 extend upwardly from the flange portion 121 and are of parallel plate-like form with arcuate upper ends 131 extending widthwise in planes normal to the plate 2 and rear side portion 132 merging into the rear surface of the plate 2. At forward sides the arcuate upper ends are reversely curved adjacent the flange 121 to merge smoothly with the forward side of the cover plate 9 as seen in FIG. 3. The arms 13 are formed with opposed circular apertures 14 concentric with the arcuate ends 131 and spaced above the flange portion 121.

The plate 2, toroidal portion 4, flange 121 and shackle arms 13 are suitably formed as a unitary metal casting with cast raised portions 123 extending between the flange 121 and opposite ends of the toroidal portion 4 providing a seating for upper side portions of the cover plate 9 and accommodating the upper threaded apertures 11. A cast raised portion 124 is also formed centrally at a lower portion of the toroidal portion 4 to accommodate the lower threaded aperture 11.

A generally toroidal shackle pin 16 of circular section and extending through a major part of a circle is arcuately telescopically mounted in the passage 43 of the toroidal portion and extends through the open end 45 and upwardly therefrom through both of the apertures 14 in the arms 13 to project beyond the shackle staple 12 at its free end 161. At its lower end 162 the pin 16 terminates at a lower portion of the passageway 43 spaced from the closed end 44 by an amount such that the pin 16 may be rotated clockwise as seen in FIG. 1 to withdraw the free end 161 through the apertures 14 and clear of the space between the arms 13 before the lower end approaches the closed end 44 of the passageway 43.

A compression spring 20 is disposed within the passageway 43 between the closed end 44 and the lower end 162 of the pin 16 and is adapted to bias the pin 16 counterclockwise to the position shown in FIG. 1, and to accommodate compression sufficient to allow clockwise movement of the pin from the FIG. 1 position to clear the pin head 161 from the space between the arms. A finger-like projection 19 extends from the pin 16 generally radially outwardly in forwardly inclined manner at a side of the shackle arms 13 opposite to the pin head 161. The projection 19 is arranged to be clear of the adjacent shackle arms 13 when the spring 20 is relaxed, in the FIG. 1 condition, to facilitate manual engagement for release purposes by urging the pin 16 clockwise against the spring 20.

Inwardly of the pin head 161 the pin 16 is formed on its lower, radially inner surface with a shallow recess 21 arranged, when the pin 16 is in the FIG. 1 condition, between the arms 13. The recess 161, when the harness plate is in use, to engage a support rope or wire, or eye so that under supportive tension the shackle pin 16 is locked relative to the shackle staple 12.

Figure 5:
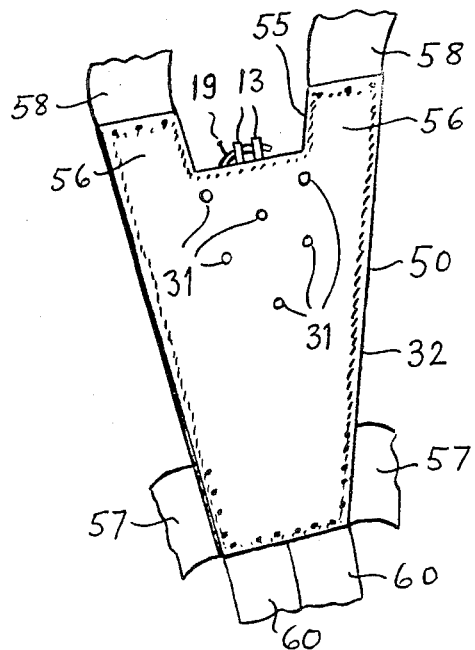
FIG. 5 is a fragmentary front elevation of a harness embodying the harness plate of FIGS. 1 to 3.
Figure 6:
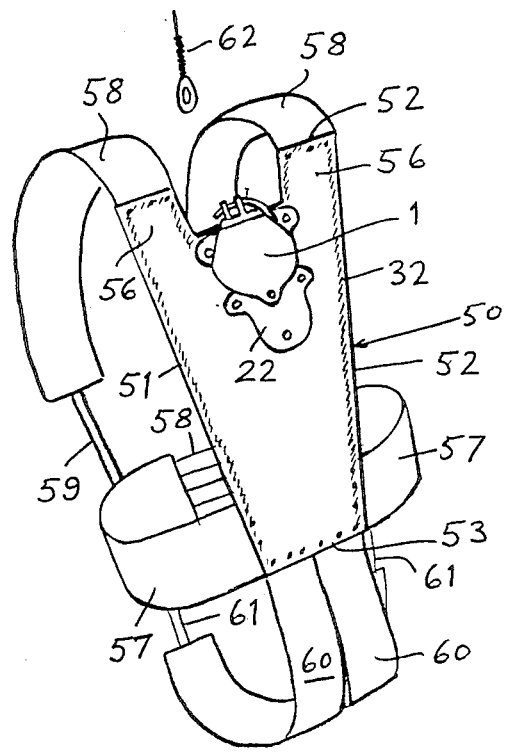
FIG. 6 is a rear perspective of the harness of FIG. 4 and showing a suspension wire and eye.

Referring now to FIGS. 5 and 6 a support harness 50 comprises a back panel 32 suitably of leather having upwardly divergent sides 51, 52 extending between a lower end 53 and a wider upper end 54. The upper end is formed with a central cutaway 55 to define on opposite sides extensions 56. A belt 57 extends from opposite sides of the panel 32 adjacent the lower end 53 and is suitably provided with release means to enable the belt to be strapped or secured about a wearer. Shoulder straps 58 extend from the extension 56 and at their free ends are provided with strap portions 59 for releasable securement to a front of the belt 57. A pair of thigh straps 60 extend from the lower end 53 of the back panel 32 and at free ends are provided with respective strap portions 61 for releasable securement to the front of the belt. The harness is of generally known form and serves to secure the back panel 32 to a wearer.

A harness plate 1 as described above in connection with FIGS. 1-4 is secured to the rear of the back panel 32, as most clearly seen in FIG. 6, centrally of the cutaway 55 with the upper edge 21 of the plate generally level with the bottom of the cutaway and with the shackle arms 13 projecting upwardly wardly into the cutaway 55 between the extensions 56 as seen in FIG. 5. In use a wearer may be releasably shackled to a support rope, wire or support eye 62 by manually operating the shackle pin 16 against the spring bias by means of the finger-like projections 19 to withdraw the pin 16 from the space between the arms 13, positioning the eye 62 between the arms 13 and releasing the projection 19 and allowing the spring to bias the pinhead through the eye 62 and the shackle arms 13, with the eye engaging the recess 21. By tensioning the support rope the wearer may be safely lifted and moved in a lifted position. On release of tension in the support rope the shackle pin 16 may readily be moved to a release condition by means of the projection 19.

It will be evident from FIG. 6 that the lower extension 22 of the shackle plate elongates the vertical extent of securement of the plate to the back panel 32 and serves to spread the vertical load between the plate and the panel.

The particular structure and mechanism of the shackle plate provides for a low profile assembly in which the plate projection rearwardly from the back panel 32 is minimal in the context of a wearer which is important for safety aspects and for theatrical aesthetics. Also the mechanism of the shackle is readily exposable for inspection and maintenance purposes by removal of the cover plate 9.

It is believed that the invention and many of its attendant advantages will be understood from the foregoing description and it will be apparent that various changes may be made in the form, construction and arrangement of the parts described without departing from the spirit and scope of the invention or sacrificing all of its material advantages, the form herein described merely being a preferred embodiment thereof.

I claim:

1. A harness adapted for supporting a wearer suspended from a rope or wire, such as in theatrical flying, and comprising a body engaging support member adapted to be secured to the wearer, and including a back panel which overlies the back of the wearer, and with said back panel defining an upper edge when being worn, a shackle assembly mounted to said back panel adjacent said upper edge thereof for releaseably attaching said support member to an eye at the end of a support rope or the like, said shackle assembly comprising (a) a harness plate overlying and secured to said back panel, said harness plate having an upper edge, an outwardly facing side, and means on said outwardly facing side defining an open channel of generally circular configuration and which extends through a major part of a circle which is substantially centered on said plate, and with one end of said channel communicating with said upper edge of said plate at a location offset from a line extending vertically upwardly from the center of said circle, and the other end of said channel being closed, (b) a gnerally flat cover plate mounted to said outwardly facing side of said harness plate and so as to cover said open channel, and such that said channel and cover plate define a generally toroidal passage having a closed inner end and an open outer end at said upper edge of said harness plate, (c) staple means connected to said upper edge of said harness plate and including a pair of upwardly extending arms positioned on respective opposite sides of said line extending vertically upwardly from the center of said circle, and with said arms having respective apertures which are aligned along a continuation of said circle, (d) a toroidal pin having a curvature generally corresponding to that of said circle and being slideably mounted in said toroidal passage in an arcuate telescopic manner, said pin having a length sufficient to extend through a substantial portion of the length of said passage and through said apertures of said arms of said staple means to define an operative position, and (e) a compression spring mounted between the closed inner end of said passage and the adjacent end of said pin and so as to bias said pin through said apertures and toward said operative position, and being compressible to permit reverse movement of said pin in said passage, whereby an eye at the end of a support rope or the like may be positioned between said arms and secured by said pin passing therethrough.

2. The harness as defined in claim 1 wherein said toroidal pin includes a projection positioned between said open outer end of said passage and the adjacent one of said arms of said staple means, for limiting movement of said pin under bias of said spring, and for facilitating manual reverse movement of said pin.

3. The harness as defined in claim 2 wherein said projection extends upwardly and away from said harness plate.

4. The harness as defined in claim 1 wherein said toroidal pin further includes a recess along the radially inner surface thereof and which is positioned so as to be located between said arms of said shackle means in said operative position, with said recess being adapted to register with the eye at the end of a support rope or the like and such that tension in such support rope or the like will securely engage the eye in said recess to resist any tendency for lateral movement of said pin relative to said arms.

5. The harness as defined in claim 1 wherein said harness plate is secured to said back panel at a location such that said arms of said shackle means extend above said upper edge of said back panel.

6. The harness as defined in claim 1 wherein said harness plate and said staple means are composed of an integral metal casting.

7. The harness as defined in claim 1 wherein said harness plate includes an integral lower extension which extends downwardly below said toroidal passage and said cover plate, and means positioned adjacent said upper edge of said harness plate and on said extension for securing said harness plate to said back panel of said support member.

* * * * *